US008517412B2

(12) United States Patent
Tsai et al.

(10) Patent No.: US 8,517,412 B2
(45) Date of Patent: Aug. 27, 2013

(54) FOLDABLE STROLLER FRAME HAVING THREE SECTIONS JOINED TO AND FOLDABLE AROUND A COMMON HUB STRUCTURE

(75) Inventors: Denny Tsai, Chino Hills, CA (US); Jung Tsai Chen, Tainan (TW)

(73) Assignee: Baby Trend Inc., Ontario, CA (US)

( * ) Notice: Subject to any disclaimer, the term of this patent is extended or adjusted under 35 U.S.C. 154(b) by 0 days.

(21) Appl. No.: 13/241,082

(22) Filed: Sep. 22, 2011

(65) Prior Publication Data
US 2013/0076009 A1   Mar. 28, 2013

(51) Int. Cl.
*B62B 1/00*   (2006.01)
(52) U.S. Cl.
USPC ........................................ 280/647; 280/650
(58) Field of Classification Search
USPC ............... 280/642, 643–644, 647, 648–650, 280/657–658
See application file for complete search history.

(56) References Cited

U.S. PATENT DOCUMENTS

| 4,191,397 | A | 3/1980 | Kassai |
| 5,241,716 | A | 9/1993 | Kohus |
| 6,102,431 | A | 8/2000 | Sutherland et al. |
| 6,105,998 | A | 8/2000 | Baechler et al. |
| 7,632,035 | B2 | 12/2009 | Cheng |
| 2003/0030250 | A1 | 2/2003 | Suga et al. |
| 2005/0098981 | A1 | 5/2005 | Chang |
| 2005/0121882 | A1 | 6/2005 | Suga et al. |
| 2006/0021137 | A1 | 2/2006 | Waldman et al. |
| 2006/0021138 | A1 | 2/2006 | Waldman et al. |
| 2006/0071451 | A1 | 4/2006 | Cheng |
| 2006/0082104 | A1* | 4/2006 | Wun .............................. 280/650 |
| 2008/0211206 | A1 | 9/2008 | Thorne et al. |
| 2008/0258436 | A1 | 10/2008 | Storm |
| 2010/0025968 | A1 | 2/2010 | Fritz et al. |
| 2010/0045002 | A1 | 2/2010 | Cheng |
| 2010/0244408 | A1 | 9/2010 | Dean et al. |

FOREIGN PATENT DOCUMENTS
TW   201010894   3/2010

OTHER PUBLICATIONS

Baby Jogger Stroller, Double Jogging Strollers, Double Strollers—City Mini Strollers, http://www.cityministrollers.com/PhotoDetails.asp?ShowDESC=N&ProductCode=CM1GRN http://www.cityministrollers.com/City-Mini-Single-Stroller-Green-p/cm1grn.htm 4 pages, printed from the Internet on Aug. 11, 2011.
International Search Report in counterpart PCT application No. PCT/US2012/056426, dated Dec. 18, 2012.
IPRP in counterpart PCT application No. PCT/US2012/056426, dated Dec. 18, 2012.

* cited by examiner

*Primary Examiner* — John Walters
*Assistant Examiner* — James Triggs
(74) *Attorney, Agent, or Firm* — Chen Yoshimura LLP

(57) ABSTRACT

A foldable stroller frame has three sections (a lower-front section, a lower-rear section, and an upper-rear section) joined to and foldable around a common hub structure. The hub structure includes two hubs located on the left and right sides of the stroller frame. In at least one of the hubs, a bracket structure is mounted to the lower-rear section and holds two gears which are attached to the lower-front section and upper-rear section, respectively. The two gears are engaged with each other, so that the lower-front section and upper-rear section rotate in synchrony with respect to the lower-rear section when the stroller frame is being folded. The hub also includes a releasable locking mechanism, which is controlled by a pull trigger located on the upper-rear section of the stroller near the push handles, for locking the stroller frame in the unfolded state.

10 Claims, 6 Drawing Sheets

FOLDABLE STROLLER FRAME HAVING THREE SECTIONS JOINED TO AND FOLDABLE AROUND A COMMON HUB STRUCTURE

BACKGROUND OF THE INVENTION

1. Field of the Invention

This invention relates to a foldable baby stroller, and in particular, it relates to a foldable baby stroller frame having three sections that are joined to and foldable around a common hub structure.

2. Description of the Related Art

Numerous foldable baby stroller designs have been patented and implemented which allow a stroller to be folded or collapsed into a compact shape for storage or transportation.

SUMMARY OF THE INVENTION

The present invention is directed to a foldable stroller that allows easy folding and provides a compact folded shape.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, the present invention provides a foldable stroller frame which includes: a lower-front section; a lower-rear section; an upper-rear section having an end section forming a push handle of the stroller; and a hub structure, wherein the lower-front section, the lower-rear section and the upper-rear section are joined to the hub structure and are foldable with respect to one another around the hub structure, wherein the hub structure includes a first gear and a second gear, the first gear being fixedly attached to one of the lower-front section, the lower-rear section and the upper-rear section, the second gear being fixedly attached to another one of the lower-front section, the lower-rear section and the upper-rear section, and the first and second gear being engaged with each other and rotating when the stroller frame changes between an unfolded state and a folded state, the hub structure further including a releasable locking structure for preventing the lower-front section, the lower-rear section and the upper-rear section from folding with respect to one another around the hub structure, wherein the stroller frame further comprises a pull trigger located on the upper-rear section and connected to the releasable locking structure for releasing the locking structure to allow the lower-front section, the lower-rear section and the upper-rear section to fold with respect to one another around the hub structure.

In another aspect, the present invention provides a foldable stroller frame which includes: a first section; a second section; a third section; a hub structure, and a pull trigger located on one of the first, second or third sections, wherein the first, second and third sections are joined to the hub structure and are foldable with respect to one another around the hub structure, wherein the hub structure includes a first hub located on one side of the stroller frame, wherein each of the first, second and third sections includes a bar joined to the first hub, wherein the first hub includes: a bracket structure fixedly mounted on an end of the bar of the first section; a first gear fixedly mounted on an end of the bar of the second section, the first gear being rotatable around a first rotation axis defined by the bracket structure; and a second gear fixedly mounted on an end of the bar of the third section, the second gear being rotatable around a second rotation axis defined by the bracket structure, wherein the first gear and second gear are engaged with each other and rotate when the stroller frame changes between an unfolded state and a folded state; and a releasable locking structure for preventing the first, second and third sections from folding with respect to one another around the first hub, and wherein the pull trigger located on one of the first, second or third sections is connected to the releasable locking structure for releasing the locking structure to allow the first, second and third sections to fold with respect to one another around the hub structure.

It is to be understood that both the foregoing general description and the following detailed description are exemplary and explanatory and are intended to provide further explanation of the invention as claimed.

DETAILED DESCRIPTION OF THE PREFERRED EMBODIMENTS

Embodiments of the present invention provide a foldable stroller, where the stroller frame has three sections that are joined to, and foldable around, a common hub structure to fold the stroller into a compact shape.

Figure 1:
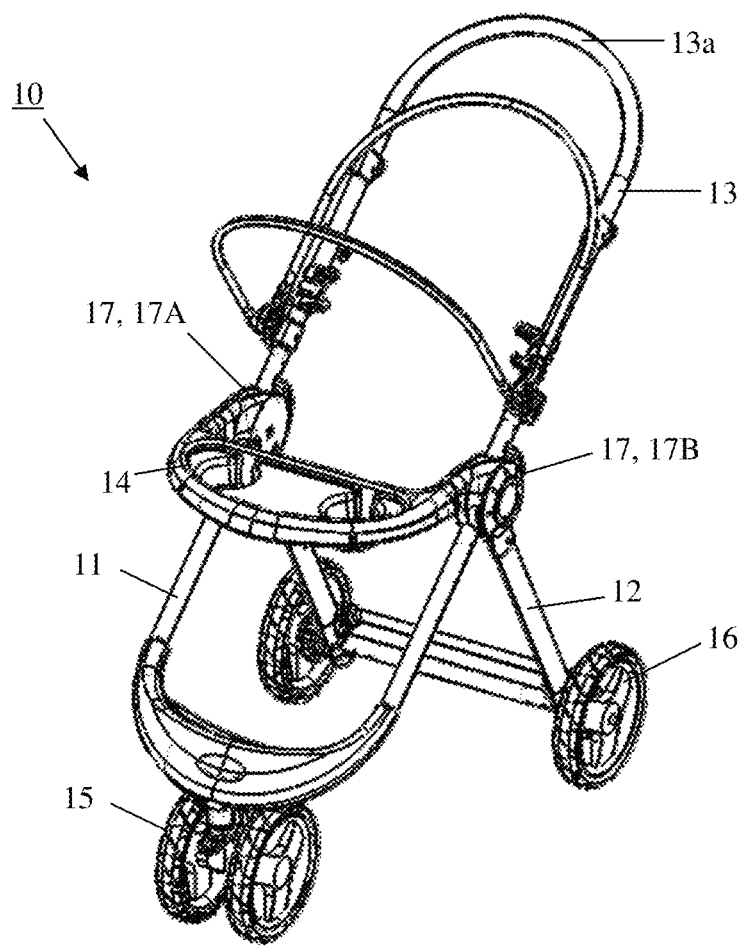
FIGS. 1 and 2 are perspective and side views, respectively, of a foldable stroller frame according to an embodiment of the present invention.
Figure 2:
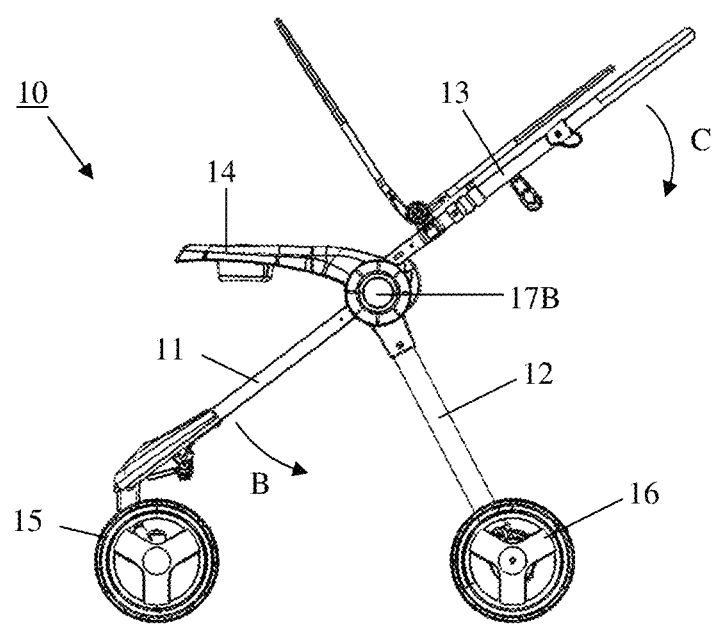
Figure 3:
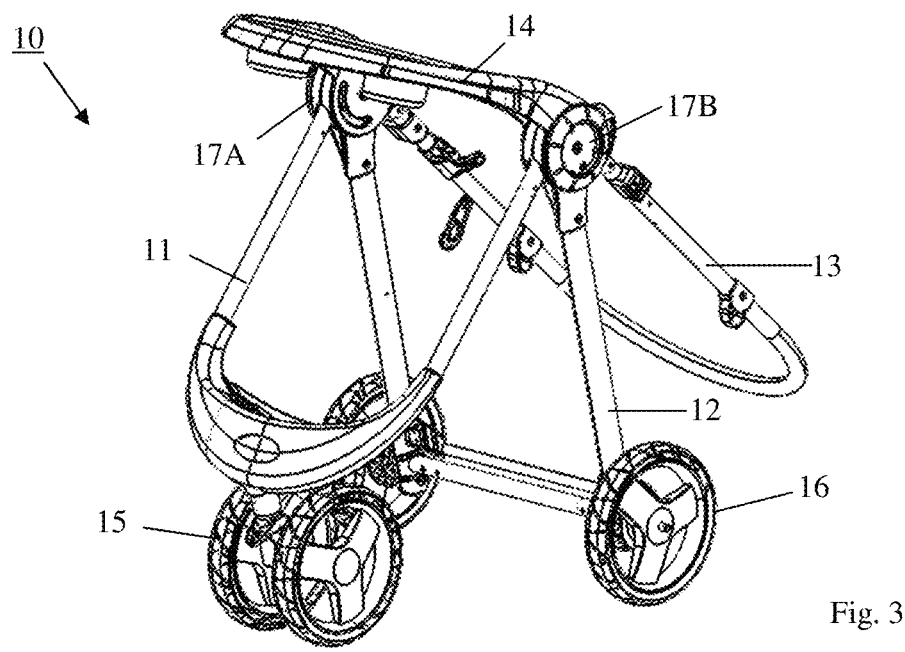
FIGS. 3 and 4 illustrate the foldable stroller frame in a partially folded and a folded state, respectively.
Figure 4:
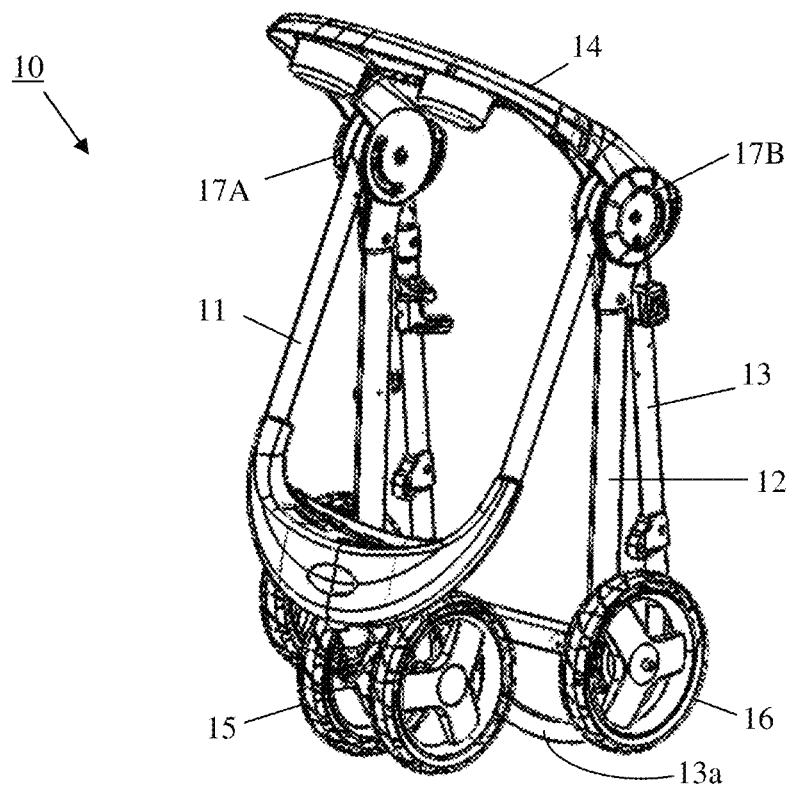

FIGS. 1 and 2 are perspective and side views, respectively, of a foldable stroller frame according to an embodiment of the present invention. FIGS. 3 and 4 illustrate the foldable stroller frame in a partially folded and a folded state, respectively.

As shown in FIGS. 1 and 2, the stroller frame 10 includes three frame sections: a lower-front section 11, a lower-rear section 12, and an upper-rear section 13. One or more front wheels 15 are mounted on the lower-front section 11, and two rear wheels 16 are mounted on the lower-rear section 12. The upper-most portion 13a of the upper-rear section 13 functions as a push handle of the stroller. The three frame sections 11, 12 and 13 are joined to a hub structure 17, which is located at a location that is substantially the center of the stroller frame in both the front-to-back direction and top-to-bottom direction (see FIG. 2).

In the illustrated embodiment, each of the frame sections 11, 12 and 13 has a pair of bars located on the left and right sides, respectively, of the stroller frame 10. While the two bars in each pair of bars shown in FIG. 1 are substantially parallel to each other, they may also be non-parallel. The space between each pair of bars is empty, forming an empty interior space between the bars, in which a child seat is located. The child seat (not shown in the drawings) is made of a flexible material such as a fabric material, and is attached to various parts of the frame sections 11, 12, and 13 by suitable means such as stitching, strapping, etc. A tray 14 may be optionally provided. In the illustrated embodiment, the tray 14 is attached to the hub structure 17, but the tray may also be attached to only the lower-front section 11 or the only the upper-rear section 13. The tray 14 may be openable or removable for easy ingress/egress of the child.

Preferably, each of the three frame sections 11, 12 and 13 has an overall shape that is substantially planar, as best seen in the side view (FIG. 2). Non-planar shapes may also be used, as long as they do not significantly interfere with folding as will be described later. For example, the shape of the frame section 11 (or 12, or 13) may be slightly curved in the side view.

The three frame sections 11, 12 and 13 are joined to the hub structure 17 so that they are foldable relative to one another by swinging motions around the hub structure, as shown in FIGS. 2, 3 and 4. When the stroller frame 10 is in an unfolded state, shown in FIGS. 1 and 2, the lower-front section 11 extends from the hub structure 17 to a lower-front location of the stroller; the lower-rear section 12 extends from the hub structure to a lower-rear location; and the upper-rear section 13 extends from the hub structure to an upper-rear location. To fold the stroller frame 10, the lower-front section 11 swings around the hub 17 backwards toward the lower-rear section 12 as indicated by the arrow B in FIG. 2; the upper-rear section 13 swings around the hub downwards toward the lower-rear section 12 as indicated by the arrow C. Note that while the lower-rear section 12 is used as a reference position in the above description, this section 12 does not have to be stationary; the movements of the three sections are relative to one another.

In the folded state, shown in FIG. 4, the front wheels 15, the rear wheels 16 and the push handle 13a are located in close proximity of one another. In this manner, the folded stroller frame 10 has a compact shape.

In the illustrated embodiment, the hub structure 17 includes two parts 17A and 17B on the two sides (left and right) of the stroller frame 10. For convenience, in this disclosure, each part is referred to as a hub and they are collectively referred to as the hub structure. The hubs 17A and 17B each have a compact shape. In a preferred embodiment, each hub is less than a few inches in size in a side view of the stroller.

A locking structure is preferably provided to lock the three sections 11, 12 and 13, i.e. to prevent them from swinging relative to one another, when the stroller is in the unfolded state. The locking structure is releasable to allow folding of the stroller frame. Any suitable locking structure may be used.

Figure 5:
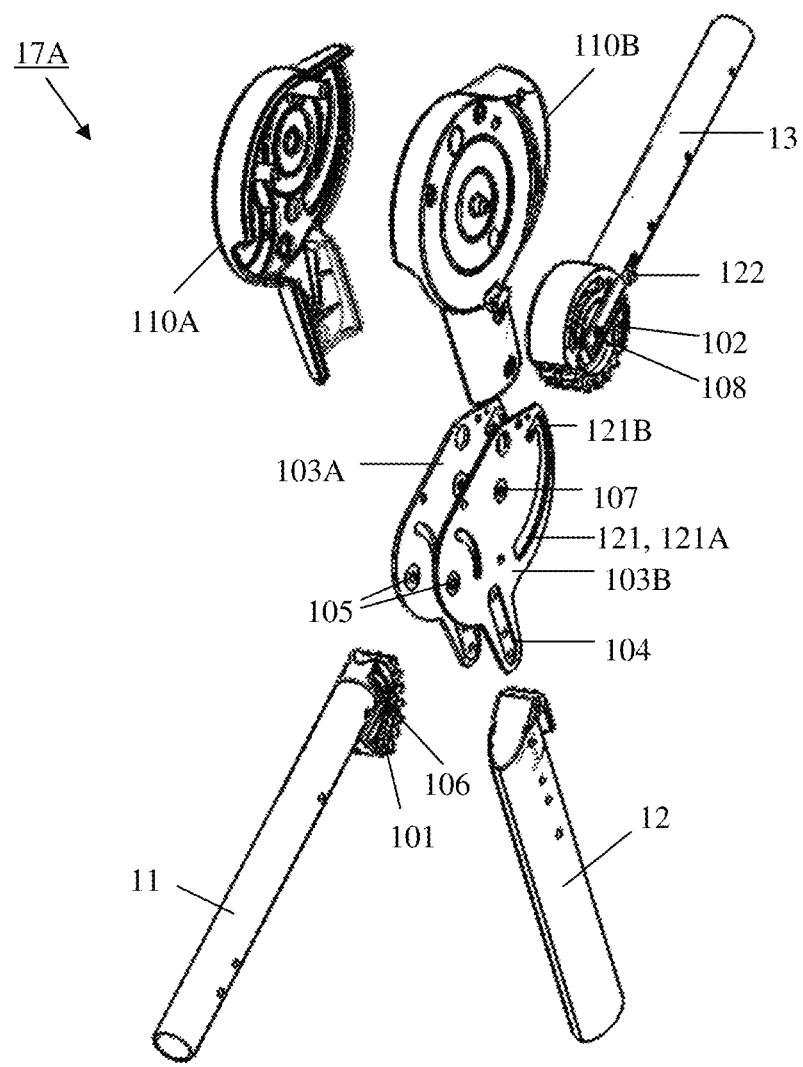
FIG. 5 is an exploded view of a hub of the stroller frame.
Figure 6:
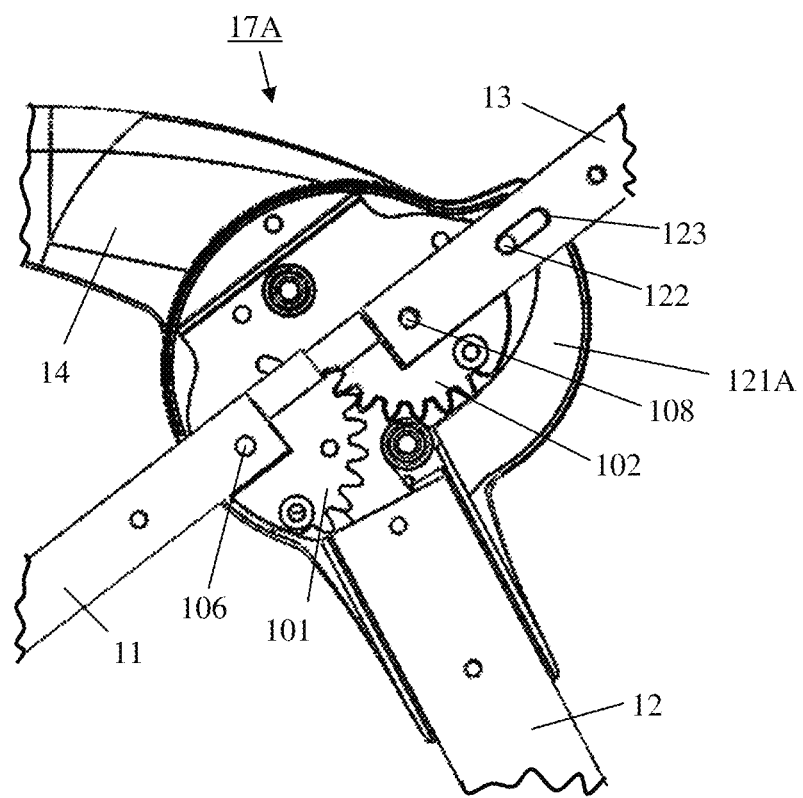
FIGS. 6-8 are partial cut-away views showing the assembled hub when the stroller frame is in an unfolded, partially folded and folded state, respectively.
Figure 7:
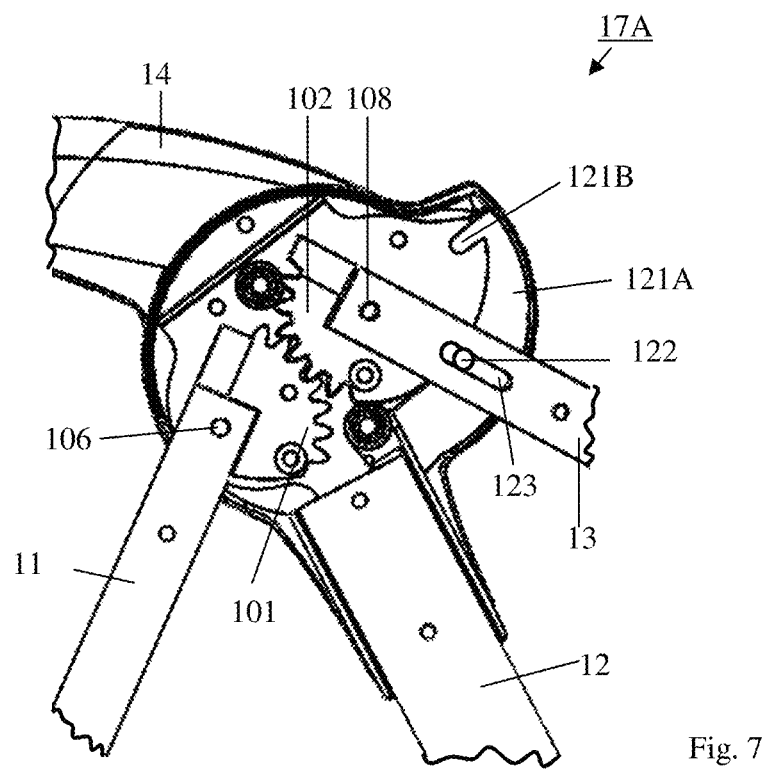
Figure 8:
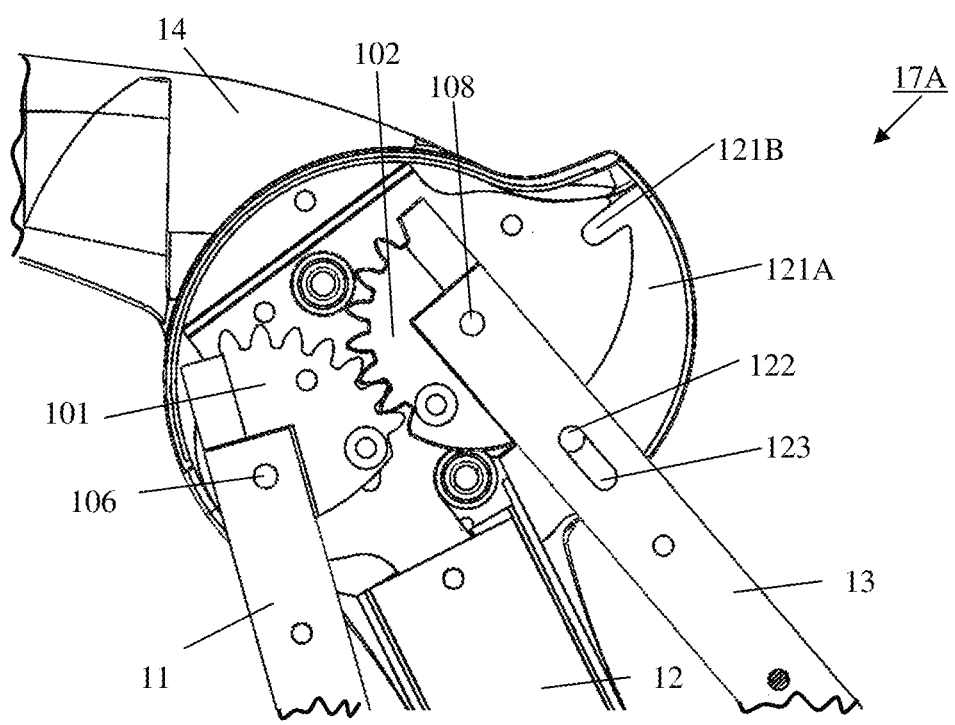
Figure 9:
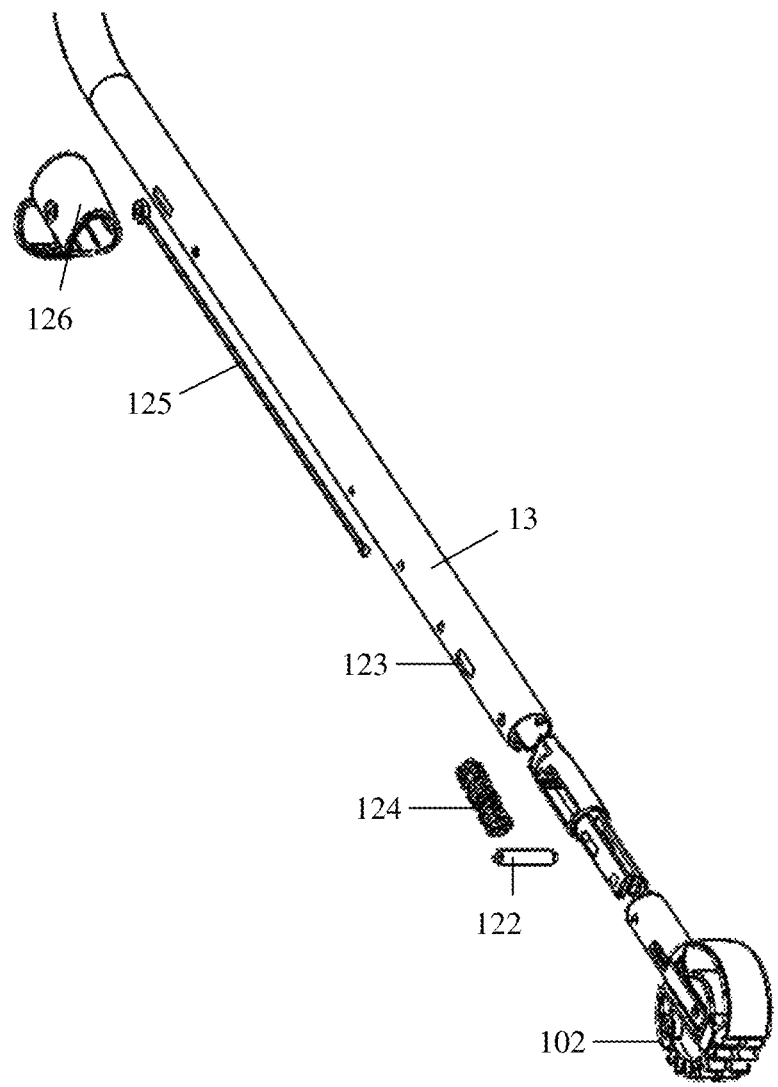
FIG. 9 is an exploded view showing a release trigger structure for a lock of the hub.

FIGS. 5-9 illustrate a mechanism that may be employed for either the left-side hub 17A or the right-side hub 17B or both of the stroller frame of FIGS. 1-4. The left-side hub 17A is used as an example here. FIG. 5 is an exploded view of the hub 17A and how it is joined to the three frame sections 11, 12 and 13. FIGS. 6-8 are partial cut-away views showing the assembled hub 17A when the stroller frame 10 is in an unfolded, partially folded and folded state, respectively. In these drawings, the frame sections 11, 12 and 13 are only represented by an end segment of each bar constituting the frame sections.

As shown in FIGS. 5-8, the hub 17A includes a first teethed member (gear) 101 fixedly attached to an end of the lower-front bar 11, and a second teethed member (gear) 102 fixedly attached to an end of the upper-rear bar 13. The first and second gears 101, 102 are engaged with each other when the hub 17A is assembled (FIG. 6-8). A bracket structure includes two plate-shaped brackets 103A, 103B disposed in parallel such that they sandwich the gears 101 and 102 between them. Each bracket has an elongated attachment portion 104 for fixedly attaching the bracket to the end of the lower-rear bar 12, which is sandwiched between the two elongated portions 104. Covers 110A, 110B are disposed on both sides of the hub 17A to cover the gears 101, 102, the brackets 103A, 103B, and an end portion of each bar 11, 12, 13.

Each bracket 130A, 130B has a first hole 105, into which a center pin (rotation shaft) 106 of the first gear 101 is inserted, such that the gear 101 (along with the lower-front bar 11) rotates around an axis defined by the holes 105. Each bracket 130A, 130B also has a second hole 107, into which a center pin (rotation shaft) 108 of the second gear 102 is inserted, such that the gear 103 (along with the upper-rear bar 13) rotates around an axis defined by the holes 107. As shown in FIGS. 6-8, the locations of the holes 105, 106 and the sizes of the gears 101, 102 are such that the teeth of the gears 101 and 102 are engaged with each other in the assembled state. As a result, the two gears 101 and 102 rotate in synchrony, so that the bars 11 and 13 swing toward or away from the lower-rear section 12 in synchrony (i.e. the lower-front section 11 and the upper-rear section 13 do not swing independently). Thus, if the user pushes the upper-rear section 13 toward the lower-rear section 12 to fold the stroller frame, the lower front section 11 will rotate toward the lower-rear section 12 by means of the gear action, without having to be pushed by the user.

As can be seen from FIGS. 5-8, due to the design of the hub 17A, the lower-front section 11 and the upper-rear section 13 do not rotate around the same rotation axis, but their respective rotation axes are both located within the hub 17A and are in close proximity of each other.

The hub 17A is provided with a releasable locking mechanism for locking the three sections 11, 12 and 13 in the unfolded state. The releasable locking mechanism includes a curved guiding slot 121 provided on each bracket 103A, 103B, and a locking pin 122 slidably disposed on the upper-rear bar 13 near the gear 102. In the assembled state, the locking pin 122 is inserted into the guiding slots 121 of the bracket 103A, 103B. As the frame sections 11, 12 and 13 swing with respect to one another when the stroller frame is being folded/unfolded, the pin 122 slides along the guiding slots 121 (see FIGS. 6-8).

As shown in FIGS. 5-8, each guiding slot 121 has an arc-shaped first part 121A and a substantially radially disposed second part 121B at one end of the first part 121A. (Both the arc and the radial direction are defined with respect to the rotation axis 107.) The pin 122 is slidable along the upper-rear bar 13 within a slot 123 that is elongated in a direction parallel to the upper-rear bar 13. The pin 122 is biased by a biasing member (e.g. a spring) 124 toward the rotation shaft 108 (see FIG. 9, exploded view of a part of the upper-rear section 13 and hub 17A). When the upper-rear section 13 is swung to the fully unfolded position (FIG. 6), the pin 122 slides in the first parts 121A of the guiding slots 121 to the point where the second parts 121B joins the first parts 121A. At this point, the pin 122 slides along the elongated slot 123 into the second parts 121B of the guiding slots 121 under the urge of the spring 124. In this position, the pin 122 is prevented from sliding along the first parts 121A of the guiding slot, so that the upper-rear section 13 is locked with respect to the lower-rear section 12. The lower-front section 11 is also locked by means of the gears 101 and 102.

To release the lock, a release wire 125 is provided inside the upper-rear bar 13 to connect the pin 122 to a pull trigger 126 located on the upper-rear bar 13, preferably just below the push handle 13a for convenience. When the user pulls the pull trigger 126, the wire 125 is pulled to overcome the biasing force of the spring 124, causing the pin 122 to retreat (along the elongated slot 123) out of the second parts 121B of the guiding slots 121. At this point, if the user pushes the upper-rear section 13 to swing it toward the lower-rear section 12, the pin 122 can now slide along the first parts 121A of the guiding slots 121. In lieu of the release wire 125 and the pull trigger 126, other suitable structures may be used to manually overcome the biasing force of the spring 124 to release the lock.

As any position along the first part 121A, the locking pin 122 will be biased by the spring 124 against the inner edge of the slot 121. This inner edge is not necessarily an arc shape centered at the hole 107 (the rotation axis of the gear 102). In the embodiment shown in FIGS. 5-8, the inner edge of the first part 121A is farther away from the hole 107 at the end where the first part 121A joins the second part 121B, and closer to the hole 107 at the other end of the first part 121A.

To summarize, the guiding slots 121, the pin 122, the spring 124, the release wire 125 and the pull tab 125 form a releasable locking mechanism. The pin 122 and the guiding slots 121 cooperates with each other to lock the swinging movement of the upper-rear section 13; the release wire 125 and the pull tab 125 operate to release the lock.

In the embodiment of FIG. 5 both brackets 103A and 103B are shown to have the guiding slots 121, and the pin 122 protrudes from both sides of the bar 13 to fit into the two guiding slots. In and alternative embodiment, the pin 122 protrudes from only one side of the bar 13, and only one of the brackets 103A and 103B on the side of the pins is required to have the guiding slots 121.

In an alternative embodiment, the locking pin 122 is located on the first gear 101, and the spring 124, the wire 125 and the release trigger 126 are correspondingly located in the lower-front bar 11. This embodiment is less convenient to the user.

In a preferred embodiment, the two hubs 17A and 17B have symmetrical structures, except that it is not necessary to provide a locking mechanism for both hubs 17A and 17B. In other words, a locking mechanism in either hub is sufficient to lock the stroller frame 10. In alternative embodiments, the two hubs may have different structures. For example, the hub 17B may omit the mating gears 101 and 102. When the two hubs have different structures, the main requirement is that they collectively define a rotation axis for the lower-front section and a rotation axis for the lower-rear section in the assembled state.

In the illustrated embodiments, the hub 17A is fixedly mounted on the lower-rear bar 12, and the lower-front bar 11 and the upper-rear bar 13 have gears mounted on them to rotate in synchrony. Alternatively, either the lower-front bar 11 or the upper-rear bar 13 may be fixed with respect to the hub and the other two bars may rotate.

Preferably, the tray 14 is rotatably mounted on the hubs 17A and 17B by a suitable mounting structure.

It will be apparent to those skilled in the art that various modification and variations can be made in the foldable stroller frame of the present invention without departing from the spirit or scope of the invention. Thus, it is intended that the present invention cover modifications and variations that come within the scope of the appended claims and their equivalents.

What is claimed is:

1. A foldable stroller frame comprising:
    a lower-front section;
    a lower-rear section;
    an upper-rear section having an end section forming a push handle of the stroller; and
    a hub structure,
    wherein the lower-front section, the lower-rear section and the upper-rear section are joined to the hub structure and are foldable with respect to one another around the hub structure,
    wherein the hub structure includes a first gear and a second gear, the first gear being fixedly attached to one of the lower-front section, the lower-rear section and the upper-rear section, the second gear being fixedly attached to another one of the lower-front section, the lower-rear section and the upper-rear section, and the first and second gear being engaged with each other and rotating when the stroller frame changes between an unfolded state and a folded state, the hub structure further including a releasable locking structure for preventing the lower-front section, the lower-rear section and the upper-rear section from folding with respect to one another around the hub structure,
    wherein the stroller frame further comprises a pull trigger located on the upper-rear section and connected to the releasable locking structure for releasing the locking structure to allow the lower-front section, the lower-rear section and the upper-rear section to fold with respect to one another around the hub structure,
    wherein the hub structure includes a first hub located on one side of the stroller frame,
    wherein each of the lower-front section, the lower-rear section and the upper-rear section includes a bar joined to the first hub,
    wherein the first hub includes a pair of brackets fixedly mounted on an end of the bar of the lower-rear section,
    wherein the first gear is fixedly attached to an end of the bar of the lower-front section, the first gear being disposed between the pair of brackets and rotatable around a first rotation axis defined by the brackets, and
    wherein the second gear is fixedly attached to an end of the bar of the upper-rear section, the second gear being disposed between the pair of brackets and rotatable around a second rotation axis defined by the brackets.

2. The foldable stroller frame of claim 1, further comprising:
    one or more front wheels mounted on the lower-front section; and
    two or more rear wheels mounted on the lower-rear section,
    wherein in the unfolded state of the stroller frame, the lower-front section extends from the hub structure to a lower-front location of the stroller frame near the front wheels, the lower-rear section extends from the hub structure to a lower-rear location of the stroller frame near the rear wheels, and the upper-rear section extends from the hub structure to an upper-rear location of the stroller frame, with an upper-most portion of the upper-rear section forming a handle of the stroller, and
    wherein in the folded state, the front wheels, the rear wheels and the push handle are located in close proximity of one another.

3. The foldable stroller frame of claim 1,
    wherein at least one of the pair of brackets defines a guiding slot having a substantially arc shaped first part and a substantially radially disposed second part connected to the first part,
    wherein the first hub further comprises:
    a locking pin slidably disposed along the bar of the upper-rear section; and
    a biasing member disposed to bias the locking pin in a direction along the bar of the upper-rear section,
    wherein the locking pin is slidable along the first part of the guiding slot as the upper-rear section rotates around the second rotation axis when the stroller frame changes between the folded and unfolded states, and the locking pin slides into the second part of the guiding slot under the bias of the biasing member when the stroller frame is in the unfolded state.

4. The foldable stroller frame of claim 3, wherein the pull trigger is connected to the locking pin by a release wire, to manually overcome the bias of the biasing member and cause the pin to slide out of second part of the guiding slot.

5. The foldable stroller frame of claim 1, wherein the hub structure further includes a second hub located on another side of the stroller frame, and wherein each of the lower-front section, the lower-rear section and the upper-rear section includes a second bar joined to the second hub.

6. A foldable stroller frame comprising:
   a first section;
   a second section;
   a third section;
   a hub structure; and
   a pull trigger located on one of the first, second or third sections,
   wherein the first, second and third sections are joined to the hub structure and are foldable with respect to one another around the hub structure,
   wherein the hub structure includes a first hub located on one side of the stroller frame, wherein each of the first, second and third sections includes a bar joined to the first hub, wherein the first hub includes:
      a bracket structure fixedly mounted on an end of the bar of the first section;
      a first gear fixedly mounted on an end of the bar of the second section, the first gear being rotatable around a first rotation axis defined by the bracket structure;
      a second gear fixedly mounted on an end of the bar of the third section, the second gear being rotatable around a second rotation axis defined by the bracket structure,
      wherein the first gear and second gear are engaged with each other and rotate when the stroller frame changes between an unfolded state and a folded state; and
   a releasable locking structure for preventing the first, second and third sections from folding with respect to one another around the first hub, and
   wherein the pull trigger located on one of the first, second or third sections is connected to the releasable locking structure for releasing the locking structure to allow the first, second and third sections to fold with respect to one another around the hub structure.

7. The foldable stroller frame of claim 6,
   wherein the bracket structure defines a guiding slot having a substantially arc shaped first part and a substantially radially disposed second part connected to the first part,
   wherein a releasable locking structure of the first hub comprises:
   a locking pin slidably disposed along the bar of the third section; and
   a biasing member disposed to bias the locking pin in a direction along the bar of the third section,
   wherein the locking pin is slidable along the first part of the guiding slot as the third section rotates around the second rotation axis when the stroller frame changes between the folded and unfolded states, and the locking pin slides into the second part of the guiding slot under the bias of the biasing member when the stroller frame is in the unfolded state.

8. The foldable stroller frame of claim 7, wherein the pull trigger is connected to the locking pin by a release wire, to manually overcome the bias of the biasing member and cause the pin to slide out of second part of the guiding slot.

9. The foldable stroller frame of claim 8, wherein the hub structure further includes a second hub located on another side of the stroller frame, and wherein each of the first, second and third sections includes a second bar joined to the second hub.

10. The foldable stroller frame of claim 9, wherein each of the first, second and third sections has a substantially planar shape when viewed from a side of the stroller.

* * * * *